Aug. 14, 1956

B. H. SHORT ET AL 2,759,066

TEMPERATURE RESPONSIVE SWITCH

Filed Dec. 17, 1954

INVENTORS
Brooks H. Short
BY George B. Shaw

John T. Marvin

Their Attorney

United States Patent Office 2,759,066
Patented Aug. 14, 1956

2,759,066

TEMPERATURE RESPONSIVE SWITCH

Brooks H. Short and George B. Shaw, Anderson, Ind., assignors to General Motors Corporation, Detroit, Mich., a corporation of Delaware Application December 17, 1954, Serial No. 475,926

4 Claims. (Cl. 200—138)

This invention relates to electric switches and more particularly to a temperature responsive switch that is calibrated to indicate the limits of a predetermined temperature range.

It is an object of the present invention to provide a thermoresponsive switch that is adapted to close a circuit to an indicating means when either of the limits of a predetermined temperature range is exceeded.

It is another object of the present invention to provide a thermoresponsive switch with the proper adjustments so that the switch may be calibrated to precisely indicate the limits of a predetermined range of temperature.

A further object of the present invention is to provide a thermoresponsive switch with a pair of spaced stationary contacts that may be adjustably moved relative to the angled contact portions which are disposed on opposite sides of a movable end of a thermoresponsive bi-metallic element, so that the switch may be calibrated to precisely indicate the limits of a predetermined range of temperature variation of a medium that is in heat conducting relation with the fixed end of the bimetallic element.

Another object of the present invention is to precisely indicate the upper and lower limits of a predetermined temperature range of a fluid by a single switch that is electrically connected in a circuit with an indicating means. This object is accomplished by providing the movable end of a bi-metallic element, that has one end fixed in heat conducting relation on a support, and a pair of contacts that are formed to have inclined contacting surfaces on opposite sides of the bi-metal element and are movable between a pair of spaced and adjustable stationary contacts that are also movable relative to the inclined contacting portions to provide the switch with an adjustment to precisely indicate the limits of the predetermined temperature range.

Further objects and advantages of the present invention will be apparent from the following description, reference being had to the accompanying drawings, wherein a preferred embodiment of the present invention is clearly shown.

Figure 3:
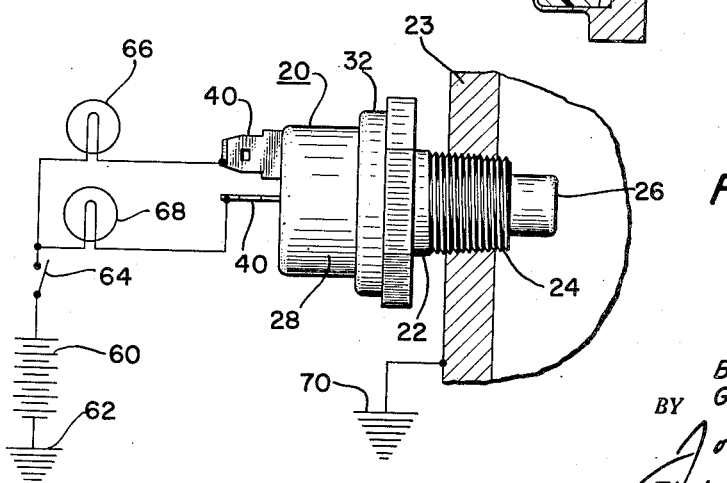

Figure 3 schematically shows a wiring diagram wherein the switch according to the present invention may be included.

Figure 1:
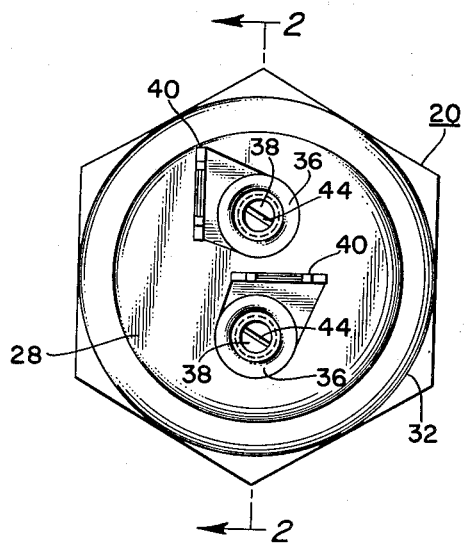
Figure 1 is an end view of a temperature responsive switch according to the present invention.
Figure 2:
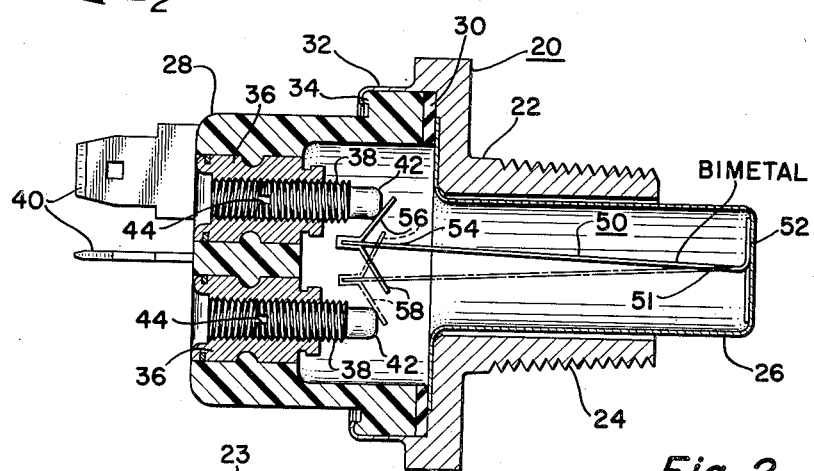
Figure 2 is a view in section along line 2—2 in Figure 1.

In the drawings and in Figure 2 particularly the numeral 20 designates a temperature responsive switch that has a support member 22 which has a bore extending therethrough and a threaded portion 24 that is adapted to engage the threads in an opening in a container 23 partially shown in Figure 3. The switch 20 is provided with a metallic cylindrical cup-shaped member 26 that is received in the bore of member 22 and is surrounded by fluid within container 23. The cup-shaped member 26 has an open end that is closed by an insulating member 28. The insulating member 28 is sealed relative to support member 22 and cup member 26 by a packing 30 which is compressed when an extending flange 32, as formed on support member 22, is beaded over the external annular rib 34 as formed on insulating member 28.

The switch 20 is also provided with a pair of spaced stationary contacts 38. These contacts 38 are adjustably carried in a pair of metallic sleeve members 36 which are anchored in spaced relation in the insulating member 28. The sleeve members 36 each have a threaded internal bore wherein the contacts 38 may be adjusted and electrically connected with a pair of terminals 40 which are connected, and held in place by riveting a portion of sleeve 36 over the terminal 40.

As clearly seen in the drawings the contacts 38 have dome-shaped heads 42. These heads 42 on the contacts 38 may be axially moved relative to the cup-shaped member 28 when the contacts are threadedly moved within the sleeve members 36. The threading of these contacts 38 in sleeve members 36 is facilitated by screwdriver slots 44 which are located in the ends of contacts remote from the dome-shaped heads 42. Further if desired, the end of the sleeve 36 that protrudes into the cavity inside of insulator 28 may be deformed to give a locknut action, so that when properly adjusted, the screw 38 cannot change its setting, and its calibration.

The bimetallic element 50 of switch 20 has a fixed end 52 suitably attached to the bottom of the cup-shaped member 26 to receive heat from the fluid in container 23. This heat is conducted through the cup-shaped member 26 to the bimetallic element 50 and is transmitted to the temperature responsive portion 51 of bimetal element 50. The portion 51 changes shape when heated and moves the contacts 56 and 58, as will be hereinafter described, which are located on the free or movable end 54 of bimetallic element 50.

As most clearly seen in Figure 2, the movable end 54 of bimetal 50 is provided with a bifurcated or Y-shaped contact portion which consists of a pair of arms 56 and 58 which extend at an angle from opposite sides of the bimetal strip 50. This bifurcated end may be integrally formed with the bimetallic element or may consist of a separate Y-shaped part that is secured to the end 54 to provide the arm portions 56 and 58 which serve as contacts and which are movable between the spaced stationary contacts 38 to alternately make contact with one or the other. The arm portions 56 and 58 can also be made of two separate pieces, which are welded to the bimetal. From the above it is apparent that if the fluid within container 23 is at a temperature lower than the minimum temperature for which the parts of the switch are adjusted, the bimetallic element will assume a shape which will cause the contact arm 56 to engage the upper stationary contact 38 as shown in Figure 2. When the fluid reaches a predetermined temperature, the bimetallic element will respond by a change of shape and cause the engagement between contacts 56 and 38 to be broken until the temperature of the fluid reaches the upper limit of a predetermined range of temperature when the shape of the bimetallic element causes the parts of the switch to move to the position shown in dotted lines in Figure 2 wherein the contact arm 58 engages the lower contact 38. From the above it is manifest that between the limits of predetermined temperature, the contact arms 56 and 58 will be out of engagement with both of the contacts 38.

In Figure 3, the switch 20 is shown as included in electrical indicating circuit that comprises a battery 60 that has one terminal grounded at 62. The other terminal of the battery 60 is connected to a switch 64 and with a pair of indicating lights 66 and 68 which are connected respectively with the upper and lower switch terminals 40. The switch 20 in turn is threaded into and is electrically connected with the wall of the container 23 which is grounded at 70. When the switch is so installed in the indicating circuit and the temperature of the fluid within container 23 is less than the minimum temperature of a predetermined range, the arm 56 will engage the upper contact 38 as in Figure 2, and cause the lamp 66 to burn and thus indicate that the fluid temperature is less than the predetermined range. When the temperature of the fluid is between the upper and lower limits of the range of temperature, the bimetallic element will move the contacts 56 and 58 to an intermediate position so that neither of the lamps 66 and 68 will burn. When the upper limit of the predetermined range of temperature is reached, the arm 58 will engage the lower of the contacts 38 as shown in Figure 2 so that lamp 68 burns.

From the above arrangement of parts it is apparent that the shape and arrangement of domes 42 and the inclined angle of contacts 56 and 58 are important to the success of the present invention. The shape of the dome 42 and the angle of incline of the arms 56 and 58 will permit the switch according to the present invention to be calibrated to precisely indicate both limits of a predetermined range of temperature variation. Thus the tolerance at either limit will be at a minimum as, for example, a plus or minus two degrees Fahrenheit. Thus when the contacts 38 are axially moved away from the cup-shaped member 26, a greater movement of the temperature responsive portion 51 will be necessary to cause an engagement with the arms 56 and 58. When the contacts 38 are moved toward the cup-shaped member 26 a smaller range movement of portion 51 will be indicated. Thus both limits of the range of temperature variation of the fluid can be varied so that the switch may be precisely calibrated to indicate the limits of the range of temperature variation as determined by the adjustment of the switch 20 parts and the materials of the bimetallic element 50.

While the temperature responsive device according to the present invention is particularly adapted for use in the measurement of fluid temperatures at various locations in an internal combustion engine, the device may also be utilized to indicate predetermined temperature ranges in other applications and with other fluids if the metal of the bimetallic elements are selected for the temperature range involved and if the switch is properly calibrated as heretofore set forth. Further, the cup-shaped member 26 may contain a suitable fluid, such as oil. This fluid with cup member 26 will decrease the probability of arcing between the contacts and to increase the susceptibility of the device to temperature changes while damping out vibrations of the bimetallic element.

While the embodiments of the present invention as herein disclosed, constitute preferred forms, it is to be understood that other forms might be adopted.

What is claimed is as follows:

1. In a temperature responsive switch, the combination comprising, a pair of spaced dome-shaped contacts, a bimetallic strip having one end fixed in heat conducting relation on a support and the other end freely movable between said spaced contacts and a bifurcated contact portion disposed on the movable end of said element, said bifurcated portion having arms disposed at an angle on opposite sides of said strip that are arranged to engage the dome portions of said contacts when the movable end of said strip member moves in response to a predetermined temperature.

2. In a device of the character described, the combination comprising; a pair of spaced adjustable dome-shaped contacts, a temperature responsive bi-metallic strip having a fixed end attached in heat conducting relation with a support and a movable end disposed between said spaced contacts, and a Y-shaped contact engaging portion secured by its mid-portion to said movable end and having the arm portions extending at an angle from opposite sides of said strip, one of said arm portions being adapted to engage the dome portion of one of said contacts and the other arm portion being adapted to engage the dome portion of the other of said contacts to precisely indicate the limits of a predetermined temperature range when said movable end of said bi-metallic strip is moved in response to temperature variations and the dome portions of said contacts are precisely adjusted relative to said Y-shaped portion.

3. In a device of the character described, the combination comprising; a pair of dome-shaped contacts carried by a support, a temperature responsive element in heat conducting relation with a media having a variable temperature and adapted to close an electric circuit with the dome portion of either one of said contacts when the temperature of said media is without said range of temperature, said element including; a temperature responsive bi-metal strip having a fixed end in heat conducting relation with said media and a movable end arranged to move between said fixed contacts, and a bifurcated portion on the movable end of said strip having arms disposed at an angle on opposite sides of said strip that are adapted to engage the dome portion of said contacts when the movable end of said strip member is moved in response to temperature variations in said media.

4. In a device of the character described for indicating the limits of a predetermined range of temperature, the combination comprising; a support, a metallic cup member carried by said support and adapted to be surrounded by a media having a variable temperature, a pair of spaced dome-shaped contacts, each of which is adjustably carried by said support, said contacts having the dome portion thereof projecting into one end of said cup member and axially movable therein when said contact is adjusted relative to said support, and a temperature responsive bi-metallic strip member having a fixed end in heat conducting relation with said cup and a bifurcated portion on the movable end of said strip having arms disposed at an angle on opposite sides of said strip, wherein said arms are arranged to engage the dome portion of said contacts when the movable end of said strip member is moved in response to temperature variations in said media.

References Cited in the file of this patent

UNITED STATES PATENTS

| | | |
|---|---|---|
| 2,271,813 | Clayton | Feb. 3, 1942 |
| 2,541,223 | Elliott et al. | Feb. 13, 1951 |
| 2,619,566 | Mahoney | Nov. 25, 1952 |
| 2,663,860 | MacInnes et al. | Dec. 22, 1953 |
| 2,675,440 | Reifel | Apr. 13, 1954 |